United States Patent

Saito et al.

Patent Number: 5,860,394
Date of Patent: Jan. 19, 1999

[54] METHOD FOR SUPPRESSING FORMATION OF DEPOSITS ON FUEL INJECTOR AND DEVICE FOR INJECTING FUEL

[75] Inventors: Akinori Saito, Nagoya; Masao Kinoshita, Toyota; Souichi Matsushita, Aichi; Yutaka Niwa, Nagoya; Hitoshi Shibata, Nishio, all of Japan

[73] Assignees: Toyota Jidosha Kabushiki Kaisha, Toyota; Kabushiki Kaisha Toyota Chuo Kenkyusho, Aichi; Denso Corporation, Kariya; Nippon Soken, Inc., Nishio, all of Japan

[21] Appl. No.: 826,403

[22] Filed: Mar. 24, 1997

[30] Foreign Application Priority Data

Mar. 27, 1996 [JP] Japan ................................. 8-099385

[51] Int. Cl.⁶ ........................................................ F01P 1/10
[52] U.S. Cl. ...................... 123/41.31; 123/541; 123/467; 239/132.3
[58] Field of Search ...................... 123/467, 541, 123/294, 41.31; 239/132, 132.1, 132.3

[56] References Cited

U.S. PATENT DOCUMENTS

| | | | |
|---|---|---|---|
| 3,315,652 | 4/1967 | Ries et al. | 123/41.31 |
| 3,945,353 | 3/1976 | Dreisin . | |
| 4,094,465 | 6/1978 | Bastenhof | 239/132.3 |
| 4,267,977 | 5/1981 | Stockner et al. . | |
| 4,284,037 | 8/1981 | Kasting et al. | 123/41.31 |
| 4,434,940 | 3/1984 | Kupper et al. . | |
| 4,625,682 | 12/1986 | Dietrich | 123/41.31 |
| 4,860,700 | 8/1989 | Smith | 123/41.31 |
| 5,044,339 | 9/1991 | Hafner | 123/41.31 |

FOREIGN PATENT DOCUMENTS

| | | |
|---|---|---|
| 0-558-072-A | 9/1993 | European Pat. Off. . |
| 2-313-571-A | 12/1976 | France . |
| 15-26-709-A | 3/1970 | Germany . |
| Y2-59-1103 | 1/1984 | Japan . |
| A-62-103456 | 5/1987 | Japan . |
| A-63-71567 | 3/1988 | Japan . |
| U-63-151970 | 10/1988 | Japan . |
| B2-63-65823 | 12/1988 | Japan . |
| Y2-8-5336 | 2/1996 | Japan . |
| 290-996-A | 8/1953 | Switzerland . |
| 353-211-A | 5/1961 | Switzerland . |
| 583-376-A | 12/1976 | Switzerland . |

OTHER PUBLICATIONS

Preliminary Reports 921, vol. 2, of Lecture Meeting of Society of Automotive Engineers of Japan, Inc., May 1, 1992.

Primary Examiner—Erick R. Solis
Attorney, Agent, or Firm—Oliff & Berridge, PLC

[57] ABSTRACT

A formation of deposits on a fuel injector is suppressed by controlling the temperature of the nozzle holder of the fuel injector around the nozzle to maintain at least a part of the fuel remaining on the nozzle holder surface after the fuel injection in a liquid state, to thereby hold precursors of the deposits in the liquid fuel to permit the precursor to be blown out from the nozzle holder surface by a subsequent fuel injection flow.

16 Claims, 7 Drawing Sheets

METHOD FOR SUPPRESSING FORMATION OF DEPOSITS ON FUEL INJECTOR AND DEVICE FOR INJECTING FUEL

BACKGROUND OF THE INVENTION

1. Field of the Invention

The present invention relates to a method for suppressing formation of deposits on a fuel injector and a device for injecting fuel.

2. Description of the Related Art

Japanese Unexamined Patent Publication No. 62-103456 discloses a fuel injector for an internal combustion engine, having a radiating member with a high thermal conductivity, to prevent the temperature of the nozzle holder from being higher, to thereby prevent the evaporation of fuel in the nozzle holder. In general, the nozzle holder should have a durability to ensure the precise control of the fuel amount to be injected, and thus should be formed of a material with a low thermal conductivity. Therefore, this fuel injector is additionally provided with the radiating member with a high thermal conductivity to keep the temperature of the nozzle holder lower. Thus, the actual amount of fuel injected is prevented from being deviated from the target amount.

Japanese Unexamined Utility Model Publication No. 63-151970 also discloses a fuel injector for an internal combustion engine, having a radiating member with a high thermal conductivity surrounding the nozzle, and a coating with an oil repellent covering the tip of the fuel injector. If the temperature of the nozzle holder around the nozzle becomes higher, the fuel remaining on the inner surface of the nozzle after the fuel injection may be oxidized and may form the deposits. Such deposits will reduce the amount of fuel injected. To prevent this, in this fuel injector, the radiating member is provided to shield the nozzle from the radiant heat from the engine, and the coating is provided to allow the remaining fuel on the inner surface of the nozzle leaving away therefrom easily.

However, if the fuel injector is arranged in the combustion chamber of the engine to inject fuel directly into the cylinder, the radiating member or the coating as mentioned above does not suppress the temperature rise of the nozzle sufficiently, and do not suppress the formation of the deposits sufficiently.

SUMMARY OF THE INVENTION

An object of the present invention is to provide a method for suppressing formation of deposits on a fuel injector and a device for injecting fuel, capable of preventing the reduction of the amount of the fuel injected through the nozzle sufficiently.

According to one aspect of the present invention, there is provided a method for suppressing formation of deposits on a fuel injector, comprising: providing a fuel injector having a nozzle holder with a nozzle; and controlling the temperature of the nozzle holder around the nozzle to maintain at least a part of the fuel remaining on the nozzle holder surface after the fuel injection in a liquid state, to thereby hold precursors of the deposits in the liquid fuel to permit the precursor to be blown out from the nozzle holder surface by a subsequent fuel injection flow.

According to another aspect of the present invention, there is provided a device for injecting fuel, comprising: a fuel injector having a nozzle holder with a nozzle; and temperature control means for controlling the temperature of the nozzle holder around the nozzle to maintain at least a part of the fuel remaining on the nozzle holder surface after the fuel injection in a liquid state, to thereby hold precursors of the deposits in the liquid fuel to permit the precursor to be blown out from the nozzle holder surface by a subsequent fuel injection flow.

The present invention may be more fully understood from the description of the preferred embodiments of the invention as set forth below, together with the accompanying drawings.

DESCRIPTION OF THE PREFERRED EMBODIMENTS

Figure 1:
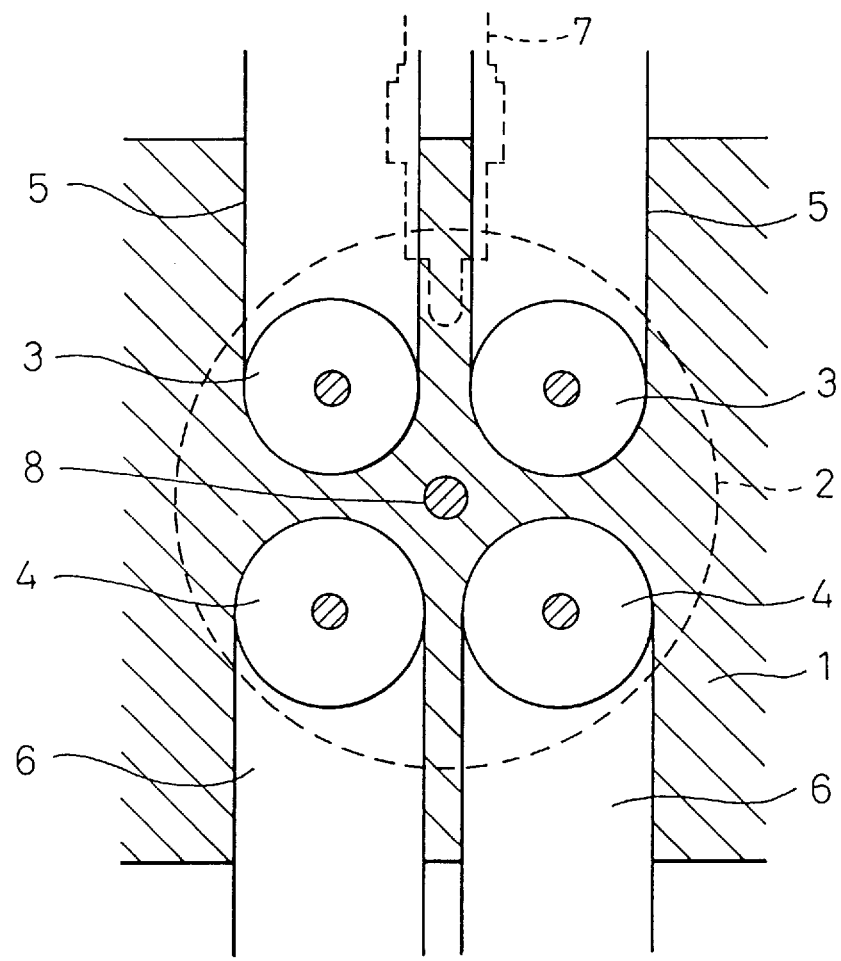
FIG. 1 is a partial cross sectional view of an internal combustion engine.

Referring to FIG. 1, the reference numeral 1 designates a cylinder head of an internal combustion engine, the numeral 2 designates a combustion chamber, the numeral 3 designates a pair of intake valves arranged on one side of the combustion chamber 2, the numeral 4 designates a pair of exhaust valves arranged on the other side of the combustion chamber 2, and the numerals 5 and 6 respectively designate a pair of intake ports and a pair of exhaust ports formed in the cylinder head 1. As shown by the phantom line in FIG. 1, a fuel injector 7 is mounted to the cylinder head 1 adjacent to the intake ports 5, and opposite to the exhaust ports 6 with respect to the intake ports 5. Note that the numeral 8 designates a spark plug.

Figure 2:
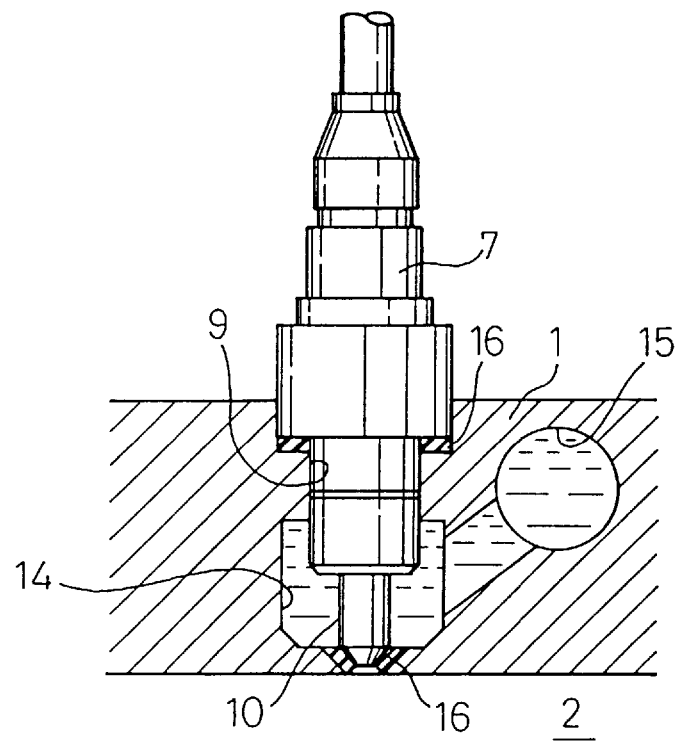
FIG. 2 is a partial cross sectional view of the engine illustrating a fuel injector.

Referring to FIG. 2, the fuel injector 7 is received in an injector receiving hole 9 formed in the cylinder head 1. The injector receiving hole 9 opens to the combustion chamber 4, and the fuel injector 7 injects fuel directly into the combustion chamber 4.

Figure 3:
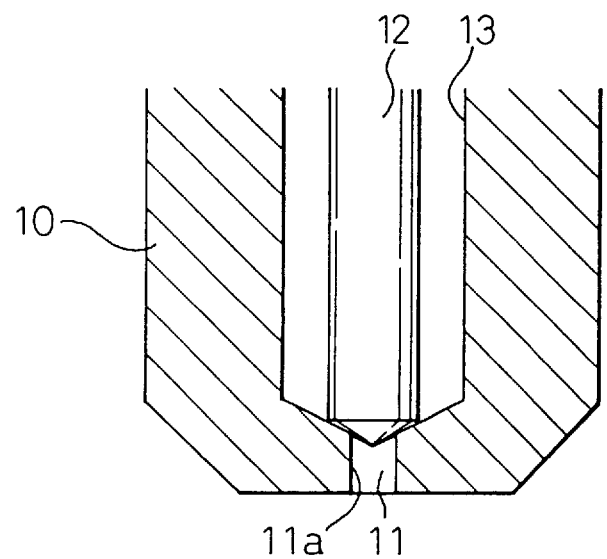
FIG. 3 is an enlarged, partial cross sectional view of the fuel injector.

As shown in FIGS. 2 and 3, the fuel injector 7 includes a nozzle holder 10 having a nozzle 11 at the tip thereof, and a needle 12 housed in a needle aperture 13 formed within the nozzle holder 10. The needle 12 reciprocates along its longitudinal axis by an electromagnetic actuator (not shown). When the needle 12 is driven to move upwardly, the nozzle 11 is opened and the fuel injection is performed. When the needle 12 is driven to move downwardly, the nozzle 11 is closed and the fuel injection is stopped.

Referring to FIG. 2 again, the injector receiving hole 9 around the nozzle holder 10 includes a cooling water collector 14 connected to the cooling water passage 15 which is generally formed in the cylinder head 1. Further, the fuel injector 7 is mounted to the cylinder head 1 via heat insulators 16. The heat insulators 16 reduce the heat conducting from the cylinder head 1 to the fuel injector 7, and serve as seals against water. Note that a portion of the nozzle holder 10 contacting with the cooling water is formed of the rust-proof material, or is covered by the water-proof material, or is plated or painted.

As mentioned at the beginning of the specification, the deposits, of carbon, hydrocarbon, etc., is formed on the surface of the nozzle holder 10, as well as on the inner surface 11a of the nozzle 11, due to the engine operation, and the fuel amount injected through the nozzle 11 is made smaller than the target amount, when the amount of the deposits on the inner surface 11a becomes large. On the other hand, the inventors of the present invention found that the formation of the deposits depends on the temperature of the nozzle holder 10 around the nozzle 11, and is suppressed sufficiently by controlling the temperature of the nozzle holder 10 with respect to the percent recovered temperature of the fuel, preferably the 90 vol % recovered temperature of the fuel. Therefore, to solve the above problem, in the present embodiment, the temperature of the nozzle holder 10 around the nozzle 11 is kept lower than the 90 vol % recovered temperature of the fuel, by the intake air, the cooling water, and the heat insulators 16. Note that the 90 vol % recovered temperature of the fuel is defined in JIS K2254, and is a temperature at which 90 vol % of the fuel is recovered or distilled.

Next, the method for suppressing the deposits formation according to the present invention will be explained in detail.

Figure 4:
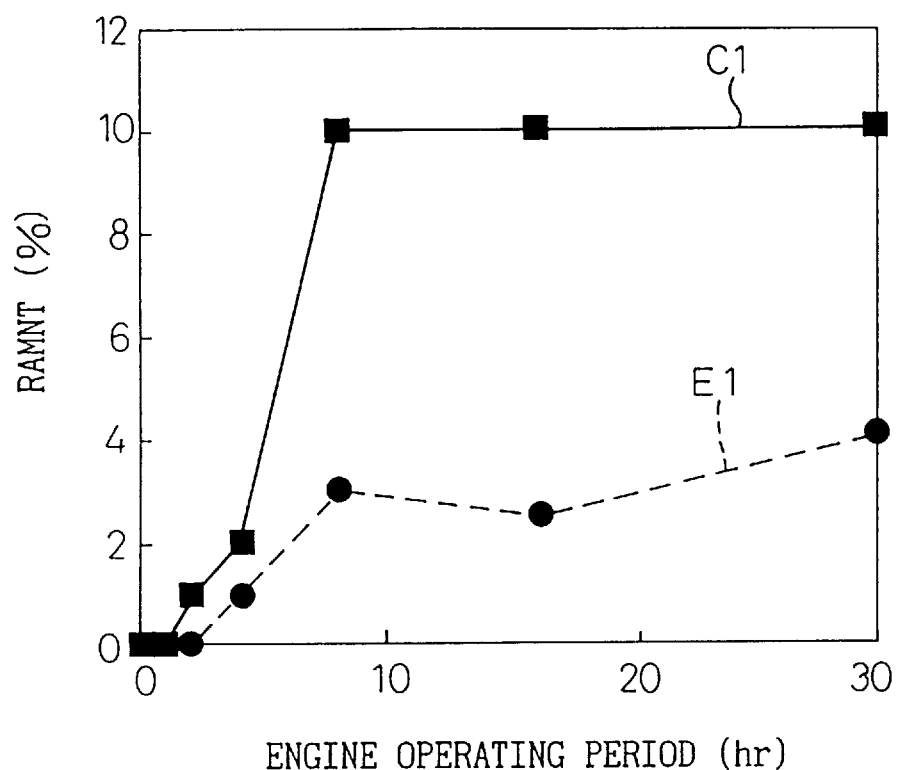
FIG. 4 is a diagram illustrating the relationships between the reduced ratio of the injected fuel amount and the engine operating period.

FIG. 4 shows relationships, obtained by experiments, between the reduced ratio of the injected fuel amount RAMNT and the continuous operating period of the engine. In FIG. 4, the temperature of the nozzle holder 10 around the nozzle 11 is kept at 165° C. Further, in FIG. 4, the solid line represents a comparative example C1 where the 90 vol % recovered temperature of the fuel is 150° C. Thus, in the comparative example C1, the temperature of the nozzle holder 10 around the nozzle 11 is kept higher than the 90 vol % recovered temperature of the fuel. The broken line in FIG. 4 represents a example E1 where the 90 vol % recovered temperature of the fuel is 168° C. Thus, in the example E1, the temperature of the nozzle holder 10 around the nozzle 11 is kept lower than the 90 vol % recovered temperature of the fuel.

As can be seen from FIG. 4, the reduced ratio RAMNT becomes larger as the engine operating period becomes longer, and reaches about 10% after 30 hours in the comparative example C1. This indicates that the deposits is formed on the inner surface 11a of the nozzle 11. Contrarily, the ratio RAMNT reaches about 4% after 30 hours in the example E1. This clearly shows that the reduction of the injected fuel amount is suppressed in the example E1.

Figure 5A:
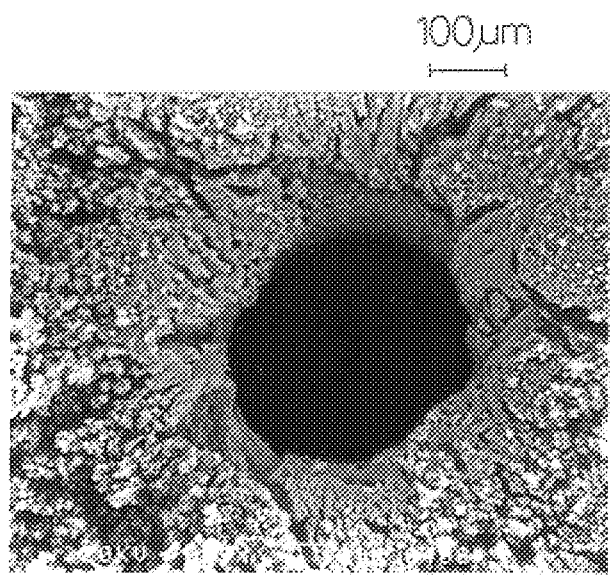
FIG. 5A is a SEM photograph of the nozzle holder around the nozzle, in the comparative example.
Figure 5B:
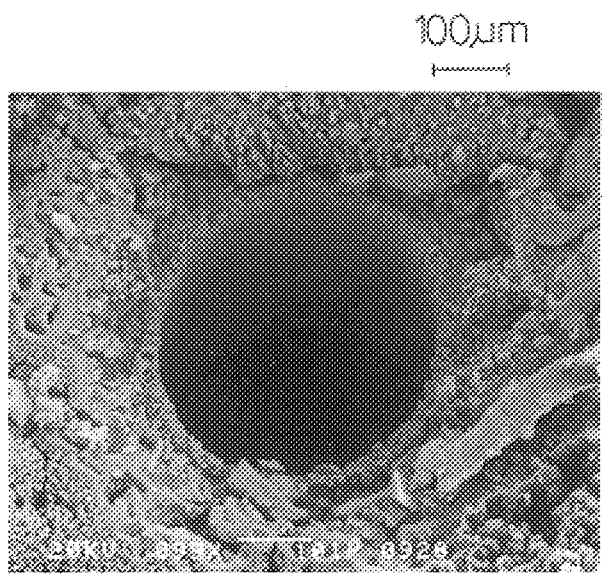
FIG. 5B is a SEM photograph of the nozzle holder around the nozzle, in the example.
Figure 5C:
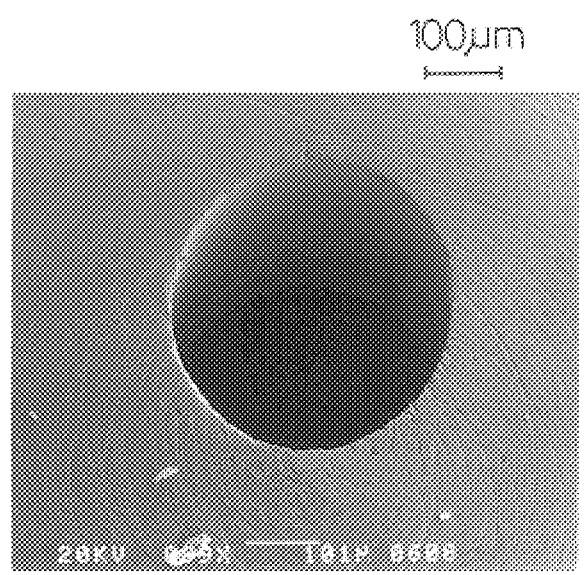
FIG. 5C is a SEM photograph of the nozzle holder around the nozzle, before the engine operation.

FIGS. 5A through 5C are SEM photographs of the nozzle holder 10 around the nozzle 11, FIG. 5A is one after the engine operation of 30 hours in the comparative example C1, FIG. 5B is one after the engine operation of 30 hours in the example E1, and FIG. 5C is one before the engine operation. These photographs are obtained with the identical solid angle. As can be seen from the comparison of FIGS. 5A through 5C, the deposits is formed on the surface of the nozzle holder 10 around the nozzle 11 by the engine operation, and the opening area of the nozzle 11, i.e., the flow area for fuel, is reduced by that deposits. Further, the reduction of the flow area in the example E1 is suppressed compared with that in the comparative example C1.

Figure 6:
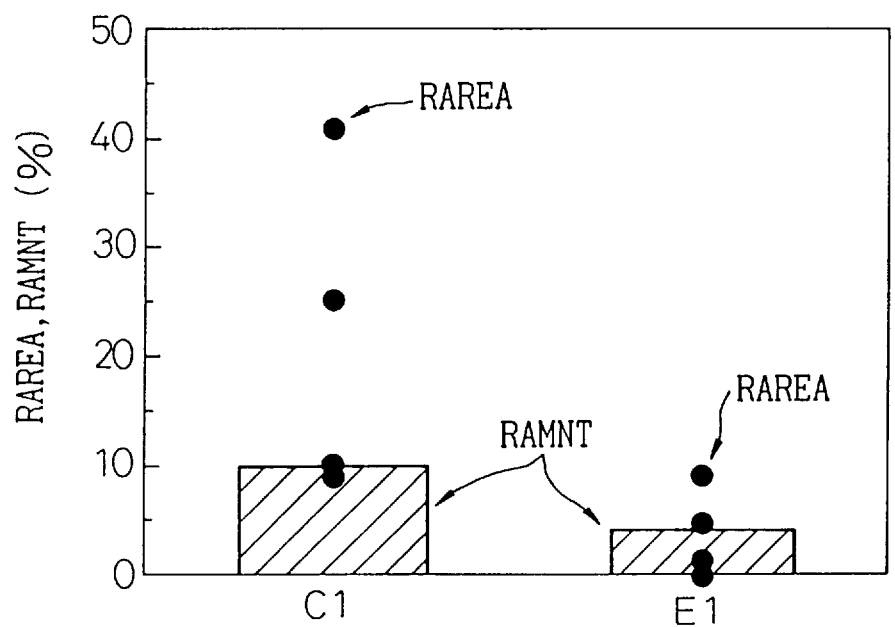
FIG. 6 is a diagram illustrating the experimental results of the reduced ratio of the flow area for fuel and the reduced ratio of the injected fuel amount.

FIG. 6 illustrates the experimental results of the reduced ratio of the flow area RAREA and the reduced ratio of the injected fuel amount RAMNT. The reduced ratio RAREA is obtained by the following equation:

$$RAREA = 1 - (d/d_0)^2$$

where $d_0$ and $d$ respectively represent the inner diameters of the nozzle 11 before and after engine operation of 30 hours. The diameter d after the engine operation was measured at four points separated by 45° increments of rotation. As can be understood from FIG. 6, the reduced ratio of the fuel amount RAMNT becomes larger when the reduced ratio of the flow area RAREA becomes larger. This shows that the reduction of the amount of fuel injected is caused by the reduction of the flow area.

Figure 7A:
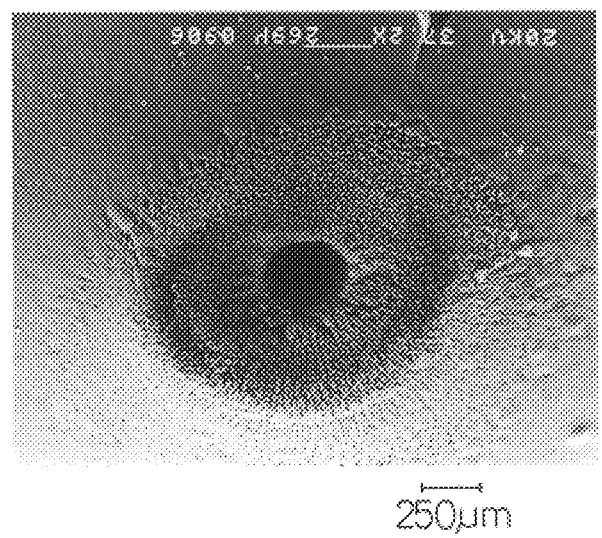
FIGS. 7A and 7B are SEM photographs of the nozzle holder around the nozzle and the exit of the nozzle, in the comparative example.
Figure 7B:
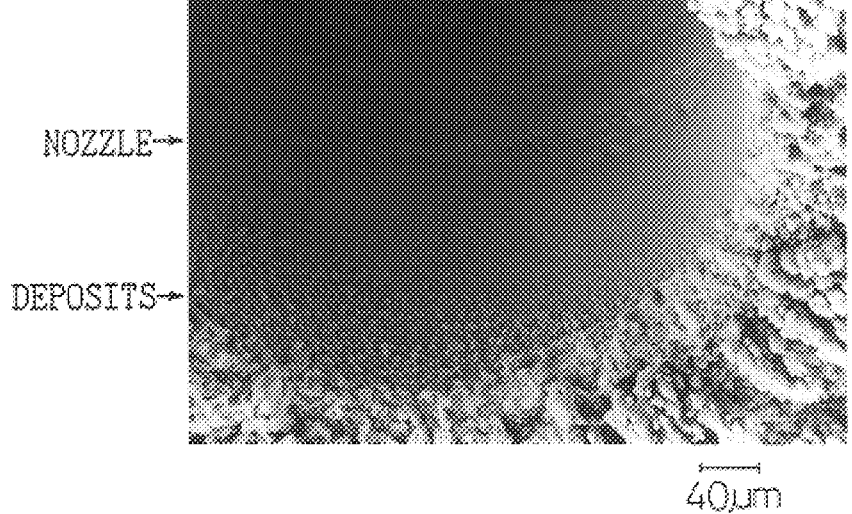
Figure 8:
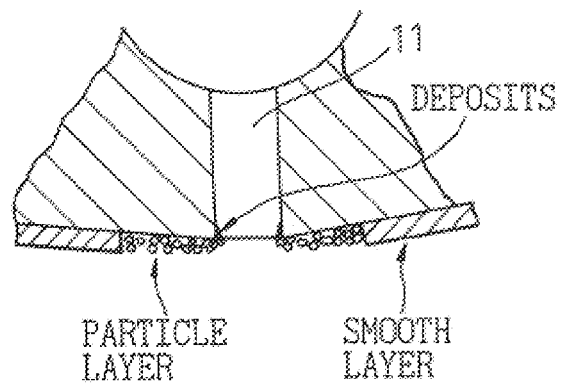
FIG. 8 is a schematic illustration of the deposits shown in FIG. 7A.

FIGS. 7A and 7B are SEM photographs of the nozzle holder 10 around the nozzle 11 and the inner surface 11a of the nozzle 11, at the beginning of the formation of the deposits, such as after the engine operation of 4 hours, in the comparative example C1. As can be seen from FIGS. 7A and 7B, the deposits in the form of the particles is formed as a layer on the surface of the nozzle holder 10 around the nozzle exit. At the outside of the particle layer, a layer having the smooth surface is formed, as schematically illustrated in FIG. 8.

The formation of the deposits starts the nozzle holder surface around the nozzle exit. After a little time from the start of the formation of the deposits on the nozzle holder surface, the deposits is also formed on the inner surface 11a of the nozzle 11, at the exit end thereof, as shown in FIG. 8. Once the deposits is formed on the inner surface 11a, the deposits layer on the inner surface 11a extends toward the upstream with respect to the fuel injection flow. When the deposits covers the entire of the inner surface 11a, the injected fuel amount is remarkably reduced where the reduced ratio RAMNT is more than 3%. In this way, the formation of the deposits on the inner surface 11a starts at a location where the fuel tends to remain on the inner surface 11a after the fuel injection.

The fuel remaining on the inner surface 11a of the nozzle 11 is heated by the heat from the inner surface 11a. As a result, the remaining fuel partly evaporates, and the precursor of the deposits contained in the remaining fuel acts as the nucleus and the dehydrogenation reaction and the polymerization occur. In this way, the formation of the deposits is performed. Namely, the deposits is not formed by the soot generated in the combustion gas, but is formed by the solidification of the fuel remaining on the inner surface 11a of the nozzle 11.

Figure 9:
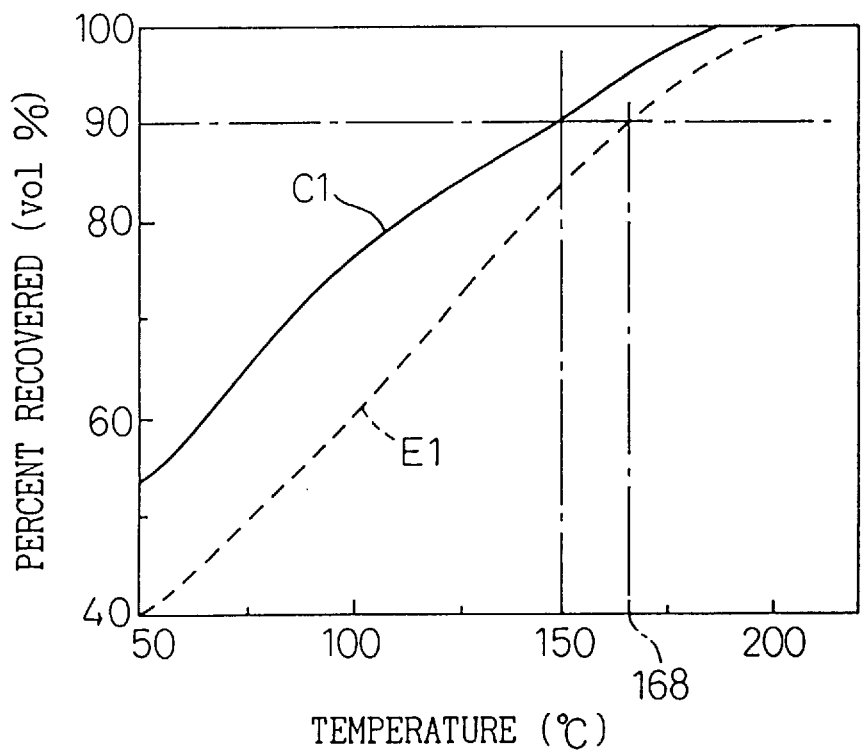
FIG. 9 is a diagram illustrating the relationship between the temperature of the nozzle holder around the nozzle and the percent recovered.

Especially, in the comparative example C1 where the temperature of the nozzle holder 10 around the nozzle (165° C.) is higher than the 90 vol % recovered temperature of the fuel (150° C.), the fraction of the fuel is 4 vol % at 165° C., as shown in FIG. 9. In other words, when the temperature of the nozzle holder 10 around the nozzle 11 is kept at 165° C., only 4 vol % of the fuel is kept in the liquid phase. This means that almost the fuel remaining on the inner surface 11a evaporates in a short time, and thus the flowability of the fuel becomes smaller. As a result, the precursor adheres to the inner surface 11a of the nozzle 11. Such an adhering precursor will not be removed from the inner surface 11a, even though the stress by the subsequent fuel injection flow acts thereon. Accordingly, the formation of the deposits proceeds.

Contrarily, in the example E1 where the temperature of the nozzle holder 10 around the nozzle (165° C.) is lower than the 90 vol % recovered temperature of the fuel (168° C.), the fraction of the fuel is 11 vol % at 165° C., as shown in FIG. 9. In other words, when the temperature of the nozzle holder 10 around the nozzle 11 is kept at 165° C., 11 vol % of the fuel is kept in the liquid phase, in this case. This means that the fuel remaining on the inner surface 11a maintains a good flowability. As a result, the precursor of the deposits is held and dispersed in the liquid fuel, without adhering to the inner surface 11a. Accordingly, the precursor is then blown out from the inner surface 11a by the subsequent fuel injection flow. In this way, the formation of the deposits is suppressed.

In short, to suppress the formation of the deposits, it is required to maintain at least of a part of the fuel remaining on the inner surface 11a after the fuel injection in a liquid state, and to hold and disperse the precursor in the liquid fuel. Therefore, in the present invention, the temperature of the nozzle holder 10 around the nozzle 11 is cooled and kept lower than the 90 vol % recovered temperature of the fuel.

The inventors of the present invention found that the 90 vol % recovered temperature of almost all of the fuel used for the automobile is, at the highest, 170° C. Accordingly, the temperature of the nozzle holder 10 around of the nozzle 11 may be kept lower than 170° C., alternatively, to suppress the formation of the deposits.

Note that the temperature of the nozzle holder 10 around the nozzle 11 may be kept lower than the 90 vol % recovered temperature of the fuel or 170° C. when the warming-up operation of the engine is not completed, without any cooling means. However, according to the present invention, the temperature of the nozzle holder 10 around the nozzle 11 is kept lower than the 90 vol % recovered temperature of the fuel or 170° C., even after the completion of the engine warming-up operation, by the intake air, the cooling water, and the heat insulators 16.

Figure 10:
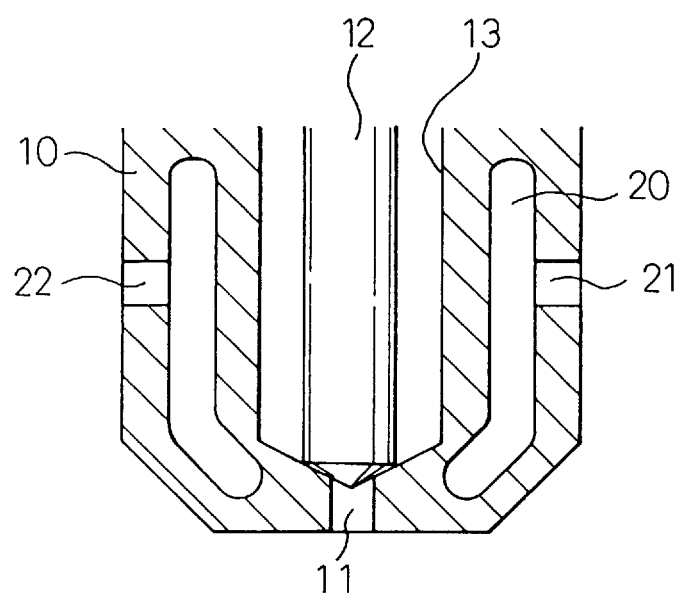
FIG. 10 is an enlarged, partial cross sectional view of the fuel injector, according to another embodiment.

FIG. 10 shows another embodiment of the present invention.

Referring to FIG. 10, a cooling water passage 20 is formed in the nozzle holder 10. The cooling water passage 20 has an inlet 21 and an outlet 22, which are adapted to be connected to the cooling water passage formed in the cylinder head. As a result, the nozzle holder 10 around the nozzle 11 is sufficiently cooled.

According to the present invention, it is possible to provide a method for suppressing formation of deposits on a fuel injector and a device for injecting fuel able to prevent the reduction of the amount of the fuel injected through the nozzle sufficiently.

While the invention has been described by reference to specific embodiments chosen for purposes of illustration, it should be apparent that numerous modifications could be made thereto by those skilled in the art without departing from the basic concept and scope of the invention.

We claim:

1. A method for suppressing formation of deposits on a fuel injector, comprising:
   providing a fuel injector having a nozzle holder with a nozzle; and
   controlling the temperature of the nozzle holder around the nozzle so that the temperature of the nozzle holder is kept lower than the 90 vol. % recovered temperature of the fuel to maintain at least a part of the fuel remaining on the nozzle holder surface after the fuel injection in a liquid state, thereby holding precursors of the deposits in the liquid fuel to permit the precursor to be blown out from the nozzle holder surface by a subsequent fuel injection flow.

2. A method according to claim 1, wherein the fuel injector is arranged in a combustion chamber of an internal combustion engine.

3. A method according to claim 1, wherein the temperature of the nozzle holder around of the nozzle is kept lower than 170° C.

4. A method according to claim 1, wherein the fuel injector is adapted to be used with an internal combustion engine, and wherein the temperature of the nozzle holder around of the nozzle is kept lower than the 90 vol % recovered temperature of the fuel and 170° C., after the warming-up operation of the engine is completed.

5. A method according to claim 1, wherein the fuel injector is adapted to be used with an internal combustion engine having an intake passage, and wherein the fuel injector is arranged adjacent to the intake passage.

6. A method according to claim 1, wherein the fuel injector is adapted to be used with an internal combustion engine having a cooling water passage, and wherein at least a part of the fuel injector is arranged in the cooling water passage.

7. A method according to claim 1, wherein a cooling water passage is formed within the nozzle holder.

8. A method according to claim 1, wherein a heat insulator is provided on the nozzle holder around the nozzle.

9. A device for injecting fuel, comprising:
   a fuel injector having a nozzle holder with a nozzle; and
   temperature control means for controlling the temperature of the nozzle holder around the nozzle at a temperature lower than the 90 vol. % recovered temperature of the fuel to maintain at least a part of the fuel remaining on the nozzle holder surface after the fuel injection in a liquid state, holding precursors of the deposits in the liquid fuel to permit the precursor to be blown out from the nozzle holder surface by a subsequent fuel injection flow.

10. A device according to claim 9, wherein the fuel injector is arranged in a combustion chamber of an internal combustion engine.

11. A device according to claim 9, wherein the temperature of the nozzle holder around of the nozzle is kept lower than 170° C.

12. A device according to claim 9, wherein the fuel injector is adapted to be used with an internal combustion engine, and wherein the temperature of the nozzle holder around of the nozzle is kept lower than the 90 vol % recovered temperature of the fuel and 170° C., after the warming-up operation of the engine is completed.

13. A device according to claim 9, wherein the fuel injector is adapted to be used with an internal combustion engine having an intake passage, and wherein the fuel injector is arranged adjacent to the intake passage.

14. A device according to claim 9, wherein the fuel injector is adapted to be used with an internal combustion engine having a cooling water passage, and wherein at least a part of the fuel injector is arranged in the cooling water passage.

15. A device according to claim 9, wherein a cooling water passage is formed within the nozzle holder.

16. A device according to claim 9, wherein a heat insulator is provided on the nozzle holder around the nozzle.

* * * * *